United States Patent [19]

Kawashima et al.

[11] Patent Number: 5,005,699
[45] Date of Patent: Apr. 9, 1991

[54] STRAPPED FASTENER ASSEMBLAGE

[75] Inventors: Masaki Kawashima, No. 10-36, Nakano 2-chome, Niizai-shi, Saitama-ken; Kouichi Miyagaki, Toda, both of Japan

[73] Assignee: Masaki Kawashima, Saitama, Japan

[21] Appl. No.: 280,364

[22] Filed: Dec. 6, 1988

[51] Int. Cl.⁵ .............................................. B65D 85/24
[52] U.S. Cl. .................... 206/344; 206/338; 206/820
[58] Field of Search ............ 206/338, 343, 344, 346, 206/347, 820

[56] References Cited

U.S. PATENT DOCUMENTS

| | | | |
|---|---|---|---|
| 3,442,374 | 5/1969 | Hillier | 206/344 |
| 3,471,008 | 10/1969 | Reich et al. | 206/344 |
| 3,625,352 | 12/1971 | Perkins | 206/344 |
| 3,966,042 | 6/1976 | Shelton | 206/344 |
| 3,967,727 | 7/1976 | Jakesch | 206/344 |
| 4,024,953 | 5/1977 | Nailor, III | 206/344 |

FOREIGN PATENT DOCUMENTS

| | | | |
|---|---|---|---|
| 2527140 | 3/1976 | Fed. Rep. of Germany | 206/344 |
| 1206949 | 9/1970 | United Kingdom | 206/344 |

*Primary Examiner*—Jimmy G. Foster

[57] ABSTRACT

A strapped fastener assemblage for an automatic fastener driver includes a pair of connecting straps made of paper, each of which has a plastic film laminated onto one surface of the connecting strap. The plastic-film-side surfaces of the connecting straps are in contact with each other. A plurality of pin-like fasteners are arranged in parallel to one another with a predetermined spacing and each of the fasteners extend transversely of and between the connecting straps; and a plurality of fastener retainers are defined by a pair of heat-sealed portions in the connecting straps extending transversely of the connecting straps, and the fastener retainer will retain a corresponding one of the fasteners.

16 Claims, 10 Drawing Sheets

STRAPPED FASTENER ASSEMBLAGE

BACKGROUND OF THE INVENTION

1. Field of the Invention

This invention relates to a strapped fastener assemblage used with an automatic fastener driver for continuously driving screws, nails and the like.

2. Description of the Prior Art

Heretofore, various types of strapped fastener assemblages used with an automatic fastener driver have been developed. These types are classified into three groups as shown in FIGS. 29 to 35.

Figure 29:
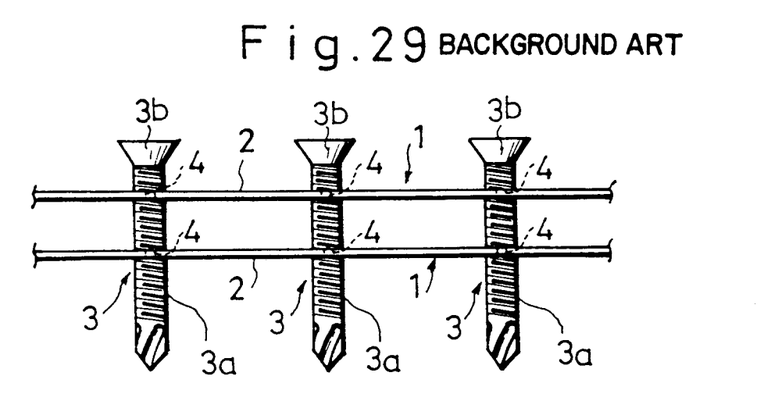
FIG. 29 is a front elevation of a conventional wired fastener assemblage.
Figure 30:
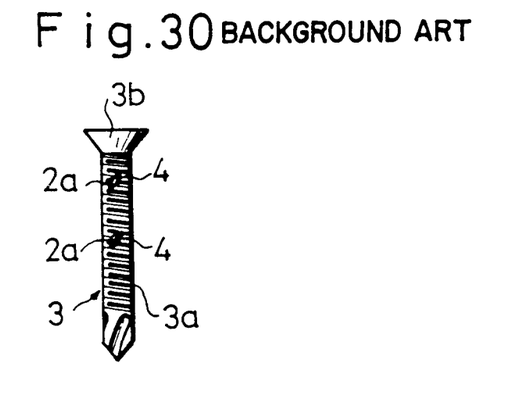
FIG. 30 is a front elevation of a screw with remaining fragments of a metal wire of FIG. 29.

A first strapped fastener assemblage 1 as shown in FIGS. 29 and 30 comprises two parallel connecting wires 2 and a plurality of fasteners, i.e., screws 3 crossing the wires 2 and arranged with a predetermined spacing along the axes of the wires 2. Points of contact 4 between the threaded portion 3a of each screw 3 and the wires 2 are joined by spot welding.

Figure 31:
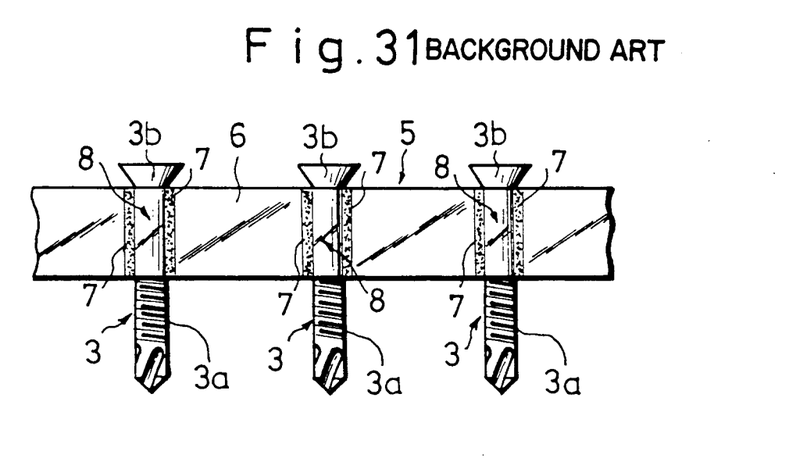
FIG. 31 is a front elevation of a second conventional strapped fastener assemblage.
Figure 32:
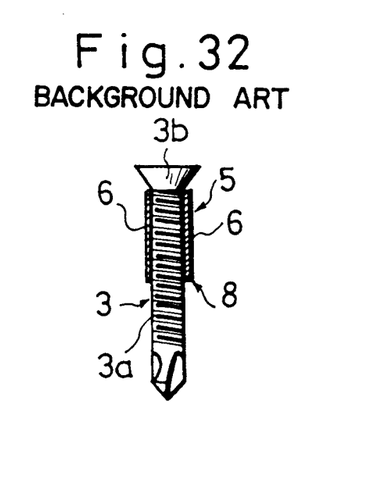
FIG. 32 is a longitudinal section of a screw retainer of the strapped fastener assemblage of FIG. 31.

A second strapped fastener assemblage 5 as shown in FIGS. 31 and 32 comprises a pair of adjacent connecting straps 6 made of a synthetic resin and a plurality of screws 3 retained between the connecting straps 6 and arranged with a predetermined spacing along the axes of the connecting straps 6. The connecting straps 6 form cylindrical screw retainers 8 each of which surrounds the threaded portion 3a of a screw 3, by means of a pair of adhesion portions 7 formed in front and rear of each screw 3 in the axes of the connecting straps 6.

Figure 34:
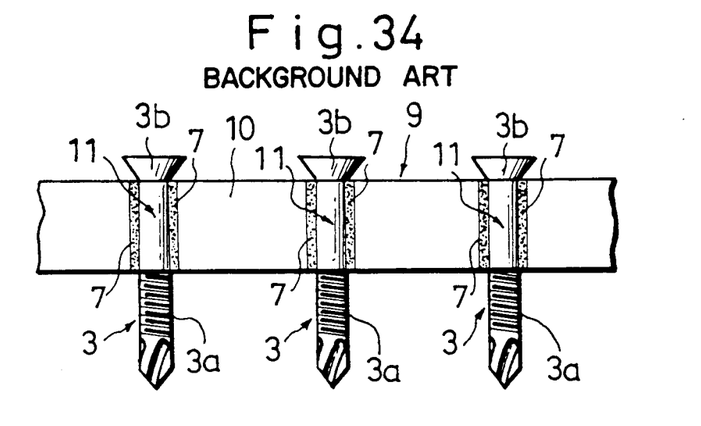
FIG. 34 is a front elevation of a third conventional strapped fastener assemblage.
Figure 35:
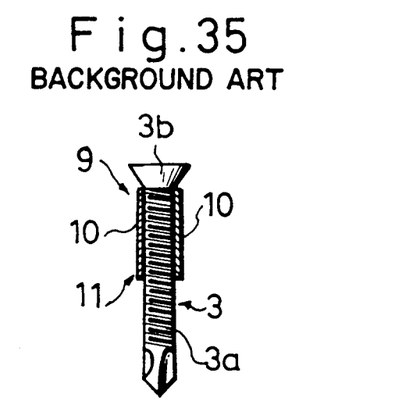
FIG. 35 is a longitudinal section of a screw retainer of the strapped fastener assemblage of FIG. 34.

A third strapped fastener assemblage 9 as shown in FIGS. 34 and 35 comprises a pair of adjacent connecting straps 10 made of paper and a plurality of screws 3 retained between the connecting straps 10 and arranged with a predetermined spacing along the axes of the connecting straps 10. The connecting straps 10 form cylindrical screw retainers 11 each of which surrounds a threaded portion 3a of a screw 3, by means of a pair of adhesion portions 7 formed in front and rear of the screw 3 in the axes of the connecting straps 10.

The conventional strapped fastener assemblages 1, 5 and 9 entail certain problems. As described above, the first strapped fastener assemblage 1 with the connecting wires comprises the screws 3 including the threaded portions 3a adjoined to the connecting wires 2 by means of the spot-welded joints 4. Thus, the spot-welded joints 4 cannot clearly be detached from the threaded portion 3a when the automatic fastener driver drives each screw 3. Fragments 2a of the wires 2 and fragments of the spot-welded joints 4 remain on the threaded portion 3a. These fragments 2a cause the threaded portions 3a to be damaged, thus blocking a secure fastening operation of each screw 3. The spot-welded joints 4 of the strapped fastener assemblage 1 require some troublesome work. Large spot-welded joints 4 cause their poor detachment from the threaded portions 3a. On the other hand, small spot-welded joints 4 cause the screws 3 to be readily detached from the connecting wires 2 when the strapped fastener assemblage 1 is in an inoperative position.

Figure 33:
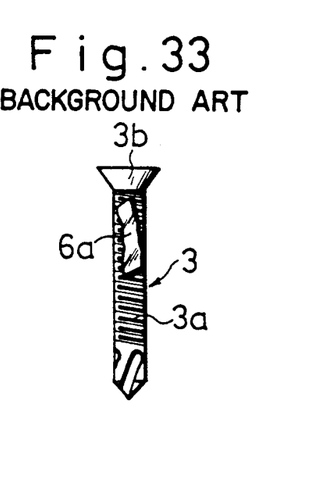
FIG. 33 is a front elevation of a screw with a remaining fragment of a strap of FIG. 31.

As described above, the second strapped fastener assemblage 5 with the connecting straps made of a synthetic resin retains each screw 3a within each screw retainer 8 defined by the adhesive portions in the two connecting tapes 6. Thus, when the automatic fastener driver drives the screws 3, the connecting straps 6 are broken into small fragments 6a which remains in a fastener magazine of the automatic fastener driver. Since the remaining fragments 6a may block continuous supply of the strapped fastener assemblage 5 into the fastener magazine, it is difficult to accurately drive the screws 3.

In addition, since the front and rear edges of each fastener retainer 8 of the strapped faster assemblage 5 include the adhesive, a component of the adhesive will chemically erode the surface of the threaded portion 3a of the screw 3 to produce rust on the surface with passage of time. The production of the rust will damage the value of commodity of the strapped fastener assemblage and will fatally damage the screws. Therefore, if the problem of the production of the rust is not resolved the service life of the screw is reduced.

The third strapped fastener assemblage 9 with the straps made of paper includes the adhesive similarly to the second strapped fastener assemblage 5. In fact, the third strapped fastener assemblage 9 increases production of rust since the paper straps have a hygroscopicity higher than the straps made of the synthetic resin in the strapped fastener assemblage 5.

SUMMARY OF THE INVENTION

An object of this invention is to provide a strapped fastener assemblage comprising: a pair of connecting straps made of paper, each of which has a plastic film laminated onto one surface of the connecting straps, the plastic-film-side surfaces of the connecting straps being in contact with each other; a plurality of pin-like fasteners arranged generally parallel to one another with a predetermined spacing there between, each of said fasteners extending transversely of and between the connecting straps; a plurality of fastener retainers, each of which is defined by a pair of heat-sealed portions of the connecting straps extending transversely of the connecting straps, said fastener retainer retaining a corresponding one of said fasteners; and separation means provided on only one connecting strap of each fastener retainer for facilitating removal of the pin-like fastener from the fastener retainer.

According to the inventive strapped fastener assemblage, the heat-sealed portions of the connecting straps will not adhere to a side surface of each fastener. When the automatic fastener driver drives the fastener into an object, the fastener separates clearly from the fastener retainer without fragments of the connecting straps remaining on the fastener. When the fastener is a screw, the fragments of the connecting straps cannot damage the threaded portion of the driven screw. The heat-sealed portions secure the full function of the fastener. The laminated plastic films of the connecting straps limit an extension and shrinkage in the connecting straps. Therefore, the screw retainers will not deteriorate with passage of time and can securly retain the fasteners. The inner surfaces of the connecting straps laminated with the plastic film protects a retained fastener from moisture contained in the connecting straps and from production of rust caused by the moisture.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIGS. 1 to 11 illustrate strapped fastener assemblages according to a first embodiment of this invention;

FIGS. 12-15 illustrate strapped fastener assemblages according to a second embodiment of this invention;

FIGS. 16-19 illustrate strapped fastener assemblages according to a third embodiment of this invention;

FIGS. 20-23 illustrate strapped fastener assemblages according to a fourth embodiment of this invention;

FIGS. 24-27 illustrate strapped fastener assemblages according to a fifth embodiment of this invention;

FIG. 29-35 illustrate conventional strapped fastener assemblages;

DESCRIPTION OF THE PREFERRED EMBODIMENTS

The preferred embodiments of this invention will be described hereinafter with reference to FIGS. 1-28. According to these embodiments, screws are used for a fastener. However, other fasteners such as a nail may be used for the fastener.

FIRST EMBODIMENT

FIGS. 1-11 illustrate the first embodiment of this invention. A strapped fastener assemblage 15 comprises a pair of connecting straps 16 and 17 adjacent each other. Each of the connecting straps 16 and 17 comprises a paper strap 18 made of kraft paper or the like and comprises a plastic film 19 made of a synthetic resin such as low-density polyethylene or polypropylene and laminated onto the inner surface of the paper strap 18. The connecting straps 16 and 17 extend so that their inner surfaces with the laminated plastic films 19 are in contact with each other. A plurality of screws 3 are retained side by side at a predetermined interval between the connecting straps 16 and 17 so that heads 3b of the screws 3 appear above the top sides of the connecting straps 16 and 17. Portions of the connecting straps 16 and 17 in front and rear of the threaded portion 3a of each screw 3 include a pair of heat sealed joints 20 extending along the axis of the threaded portion 3a of the screw 3. The pair of heat sealed joints 20 provides a cylindrical screw retainer 21 extending across the connecting straps 16 and 17. Thus, an assembly of the connecting strap 16 and 17 retains the screws 3 at the predetermined interval so that the threaded portions 3a of the screws 3 are retained within the screw retainers 21.

The strapped fastener assemblage 15 includes a line of sewing perforations 22 and 23 extending transversely of the connecting straps 16 and 17 as shown in FIGS. 4 to 11. The line of the sewing perforations 22 and 23 facilitates separation of the screw retainers 21 and the screws 3 from the other portions of the connecting straps 16 and 17.

Figure 1:
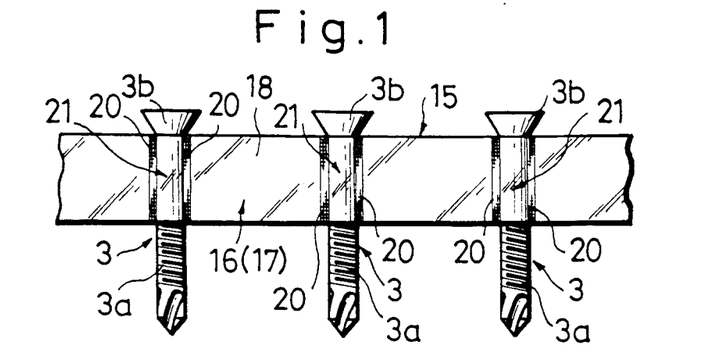
FIG. 1 is a front elevation of a strapped fastener assemblage according to a first example of the first embodiment of this invention.
Figure 2:
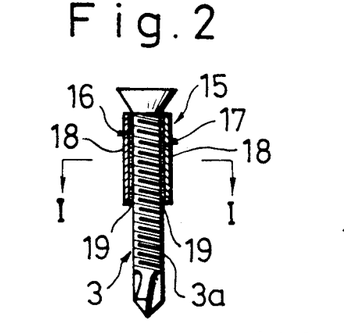
FIG. 2 is a longitudinal section of a screw retainer of the strapped fastener assemblage of FIG. 1.
Figure 3:
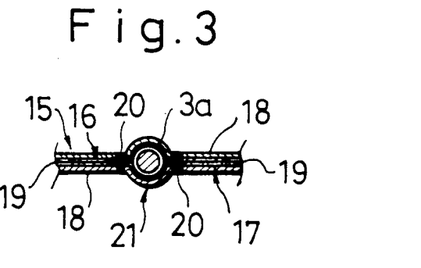
FIG. 3 is a sectional view taken along the line I—I in FIG. 2.
Figure 4:
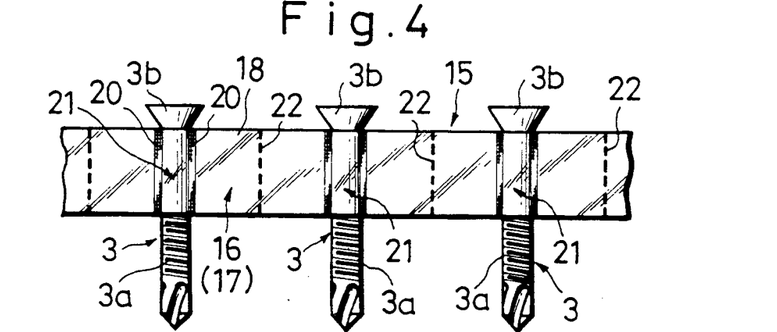
FIG. 4 is a front elevation of a strapped fastener assemblage according to a second example of the first embodiment of this invention.
Figure 5:
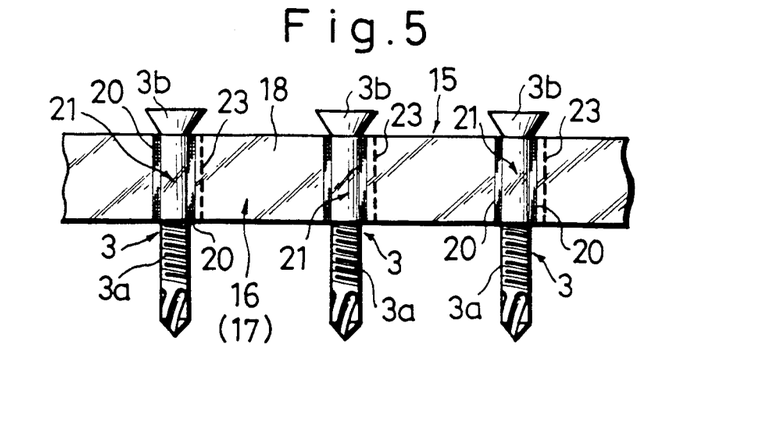
FIG. 5 is a front elevation of a strapped fastener assemblage according to a third example of the first embodiment of this invention.
Figure 6:
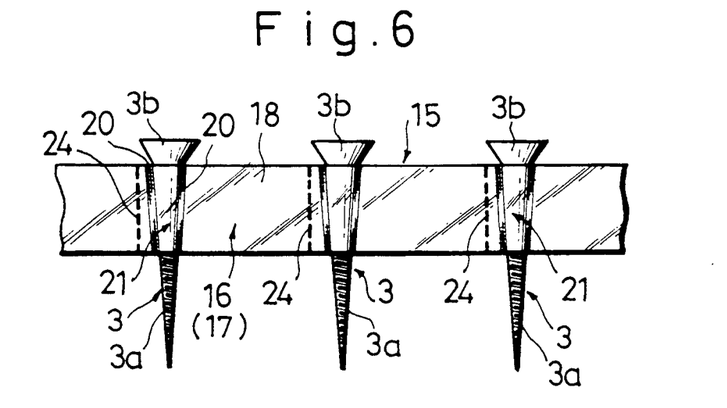
FIG. 6 is a front elevation of a strapped fastener assemblage according to a fourth example of the first embodiment of this invention.
Figure 7:
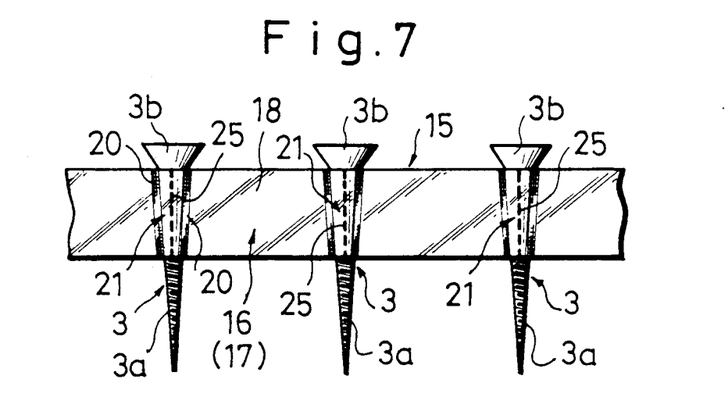
FIG. 7 is a front elevation of a strapped fastener assemblage according to a fifth example of the first embodiment of this invention.

A second example as shown in FIG. 4 has the sewing perforations 22 on the center line between adjacent screw retainers 21. A third example as shown in FIG. 5 has the sewing perforations 23 near each front heat-sealed portion 20. A fourth example as shown in FIG. 6 has the sewing perforations 24 near each rear heat-sealed portion 20. A fifth example as shown in FIG. 7 has the sewing perforations 25 on each screw retainer 21. Screws 3 as shown in FIGS. 6-8 are taper threads which are different from those of FIGS. 1-5.

Figure 8:
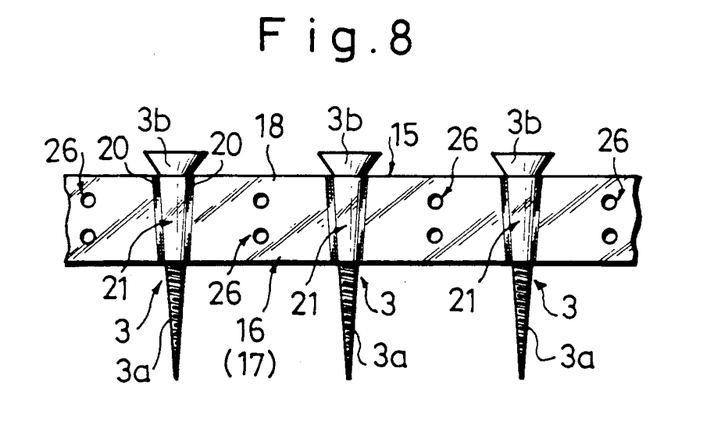
FIG. 8 is a front elevation of a strapped fastener assemblage according to a sixth example of the first embodiment of this invention.

A sixth example as shown in FIG. 8 has a plurality of (e.g., two) separation holes 26 with a diameter larger than that of each hole of the sewing perforations 22, 23, 24 and 25. The separation holes 26 are defined on the center line between adjacent screw retainers 21 and serve as a pitch hole facilitating delivery of the strapped fastener assemblage 15 with an accurate pitch to a nose of the automatic fastener driver.

Figure 9:
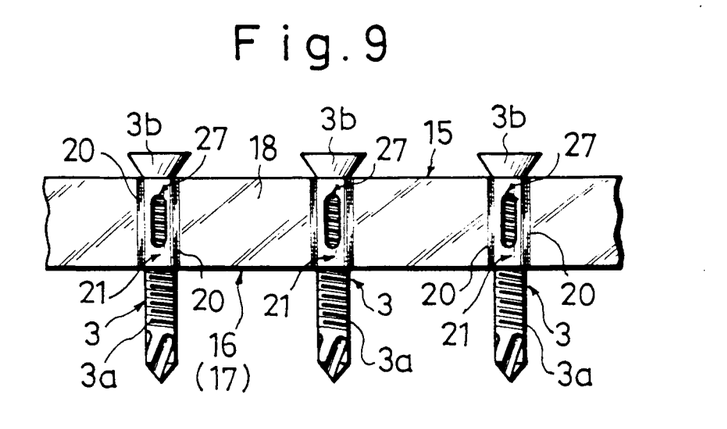
FIG. 9 is a front elevation of a strapped fastener assemblage according to a seventh example of the first embodiment of this invention.
Figure 10:
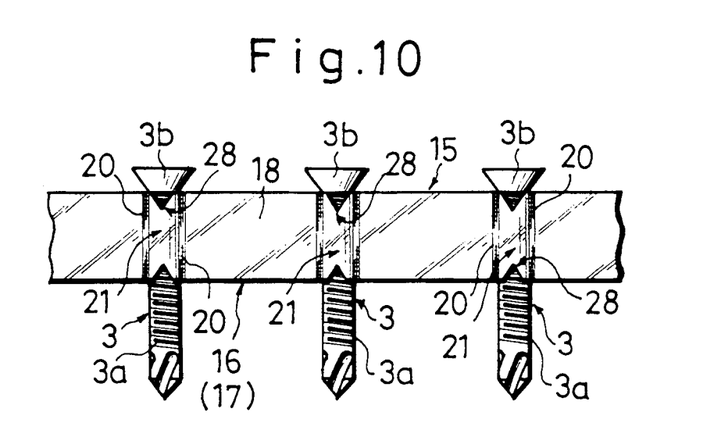
FIG. 10 is a front elevation of a strapped fastener assemblage according to an eighth example of the first embodiment of this invention.
Figure 11:
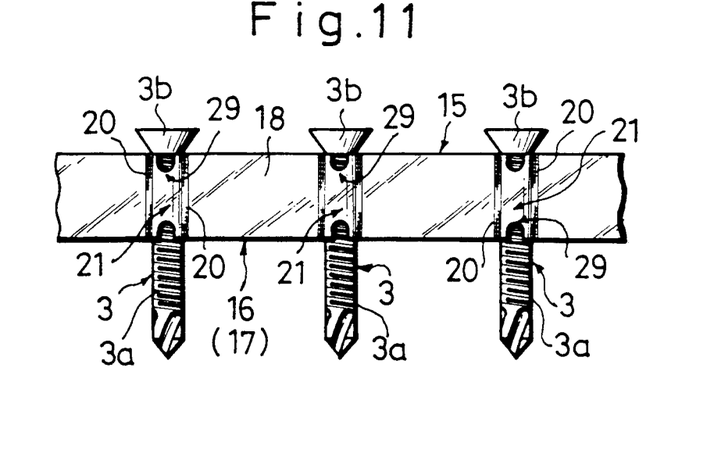
FIG. 11 is a front elevation of a strapped fastener assemblage according to a ninth example of the first embodiment of this invention.
Figure 12:
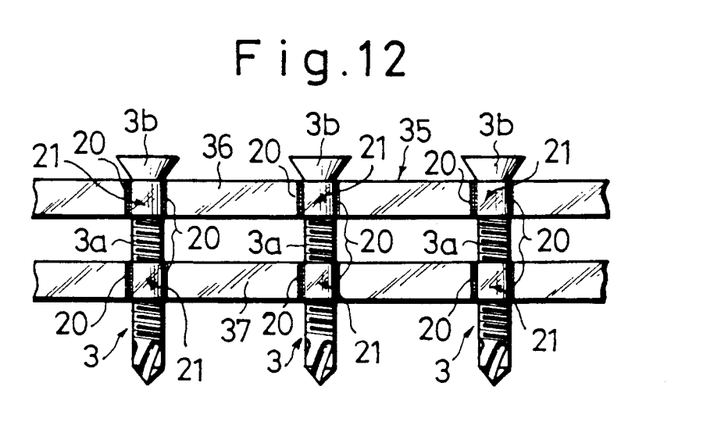
FIG. 12 is a front elevation of a strapped fastener assemblage according to a first example of the second embodiment of this invention.
Figure 13:
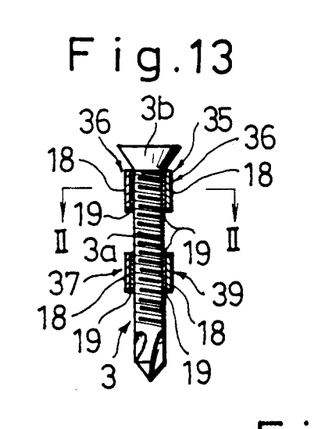
FIG. 13 is a longitudinal section of a screw retainer of the strapped fastener assemblage of FIG. 12.
Figure 14:
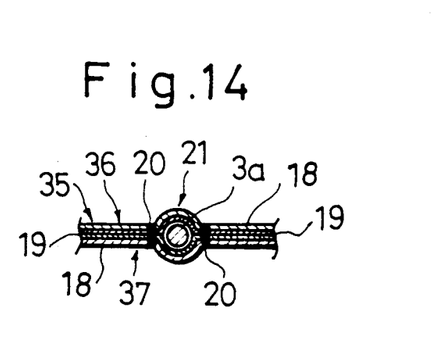
FIG. 14 is a sectional view taken along the line II—II in FIG. 13.

A seventh example as shown in FIG. 9 has a slot 27 extending transversely of the connecting straps 16 and 17 within each screw retainer 21. An eighth example as shown in FIG. 10 has a pair of V-shaped notches or slots 28 in the upper and lower edges of each screw retainer 21. The opposite points of the notches 28 are vertically aligned with each other. A ninth example as shown in FIG. 11 has a pair of U-shaped notches or slots 29 in the upper and lower edges of each screw retainer 21. The opposite bottoms of the U-shaped notches 29 are vertically aligned with each other. A line of sewing perforations may connect the opposite points of the V-shaped notches 28 and the opposite bottoms of the U-shaped notches 29 to each other. When separation holes such as the sewing perforations 22, 23, 24 and 25, the slots 27, and the notches 28 and 29 have forms facilitating fractures of the connecting straps 16 and 17, the forms of the separation holes will not be restricted to the above-described examples. Either of the connecting straps 16 and 17 may include the separation holes.

SECOND EMBODIMENT

Figure 15:
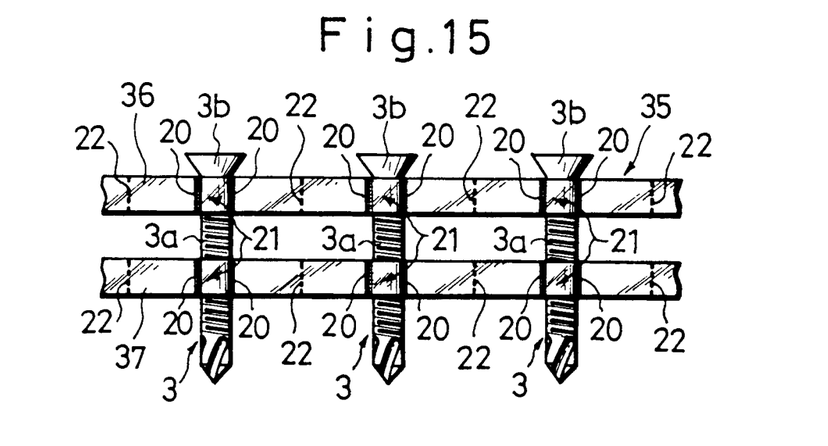
FIG. 15 is a front elevation of a strapped fastener assemblage according to a second example of the second embodiment of this invention.
Figure 16:
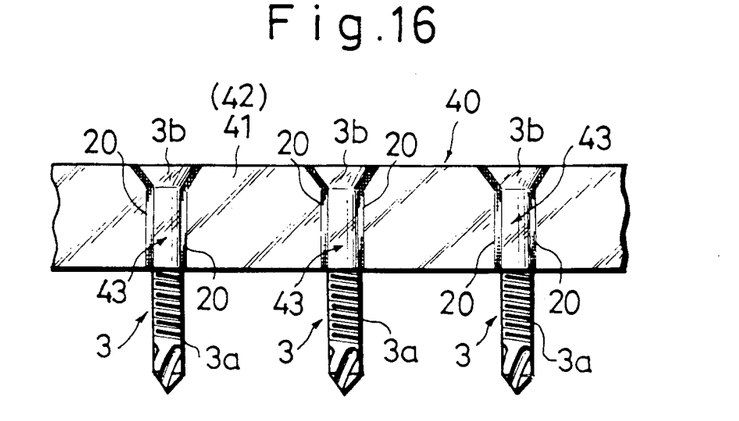
FIG. 16 is a front elevation of a strapped fastener assemblage according to a first example of the third embodiment of this invention.
Figure 17:
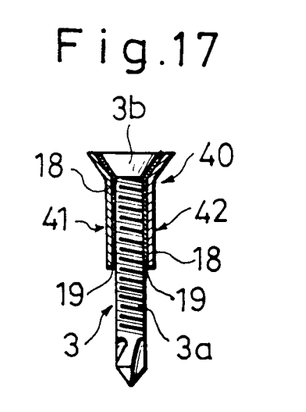
FIG. 17 is a longitudinal section of a screw retainer of the strapped fastener asemblage of FIG. 16.
Figure 18:
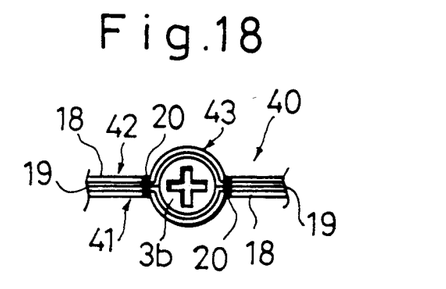
FIG. 18 is a plan view of part of the strapped fastener assemblage of FIG. 16.

FIGS. 12-15 illustrate the second embodiment of this invention. A strapped fastener assemblage 35 comprises two pairs of connecting straps 36 and 37. A pair of upper connecting straps 36 extends in parallel to the other pair of lower connecting straps 37. The pair of the upper connecting straps 36 retains an upper end of the threaded portion 3a of each screw 3 therewithin. The pair of the lower connecting straps 37 retains a lower portion of the threaded portion 3a of the screw 3. Heat-sealed portions 20 and screw retainers 21 of the pairs of the connecting straps 36 and 37, and separation holes in the pairs of the connecting straps 36 and 37 have the same arrangements as those of the first embodiments described above. A second example as shown in FIG. 15 has lines of sewing perforations 22 within the pairs of the connecting straps 36 and 37. Separation holes of the second embodiment of this invention may be the same as those of the first embodiment of this invention.

THIRD EMBODIMENT

Figure 19:
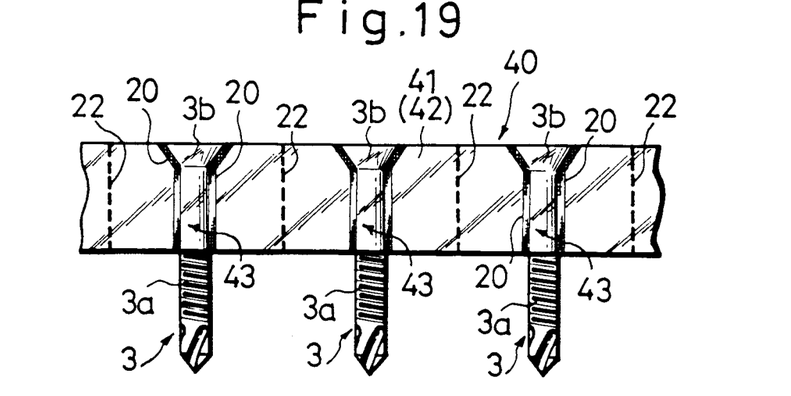
FIG. 19 is a front elevation of a strapped fastener asemblage according to a second example of the third embodiment of this invention.
Figure 20:
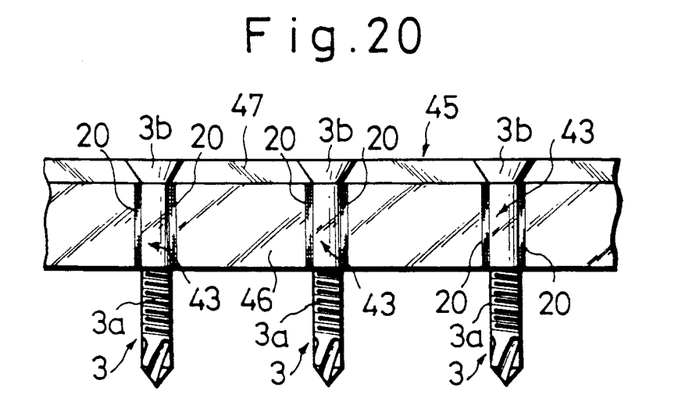
FIG. 20 is a front elevation of a strapped fastener assemblage according to a first example of the fourth embodiment of this invention.

FIGS. 16-19 illustrate the third embodiment of this invention. A strapped fastener assemblage 40 comprises a pair of connecting straps 41 and 42, the inner surfaces of which have the same laminated films as those of the first and second embodiments of this invention. Each screw retainer 43 formed by the pair of the connecting straps 41 and 42 retains the head 3b and threaded portion 3a of the screw 3 therewithin. A second example as shown in FIG. 19 has lines of sewing perforations 22 in the pair of the connecting straps 41 and 42. Separation holes of the third embodiment of this invention may be the same as those of the preceding embodiments of this invention.

FOURTH EMBODIMENT

Figure 21:
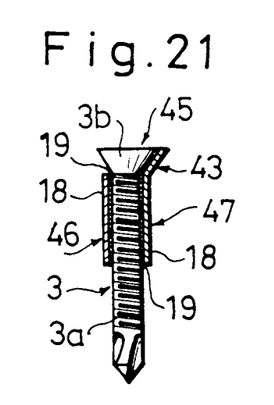
FIG. 21 is a longitudinal section of a screw retainer of the strapped fastener assemblage of FIG. 20.
Figure 22:
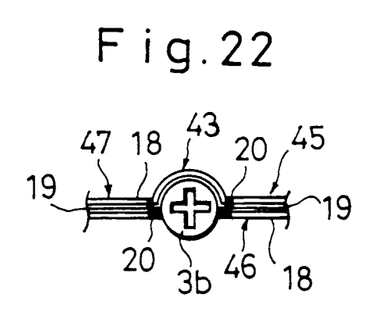
FIG. 22 is a plan view of part of the strapped fastener assemblage of FIG. 20.
Figure 23:
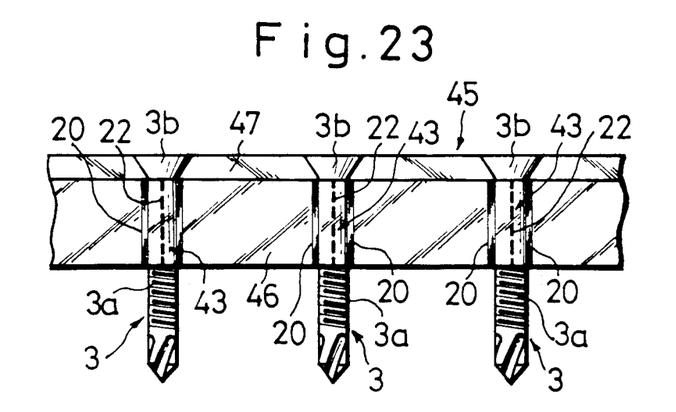
FIG. 23 is a front elevation of a strapped fastener assemblage according to a second example of the fourth embodiment of this invention.

FIGS. 20-23 illustrate the fourth embodiment of this invention. A strapped fastener assemblage 45 comprises a pair of connecting straps 46 and 47. As shown in FIGS. 21 and 22, the topside of one (e.g., a connecting strap 47) of a pair of connecting straps 46 and 47 covers part of a head 3b of each screw 3. The strapped fastener assemblage 45 is essentially the same as the strapped fastener assemblage 40 except for the arrangement of the pair of the connecting straps 46 and 47.

FIFTH EMBODIMENT

Figure 24:
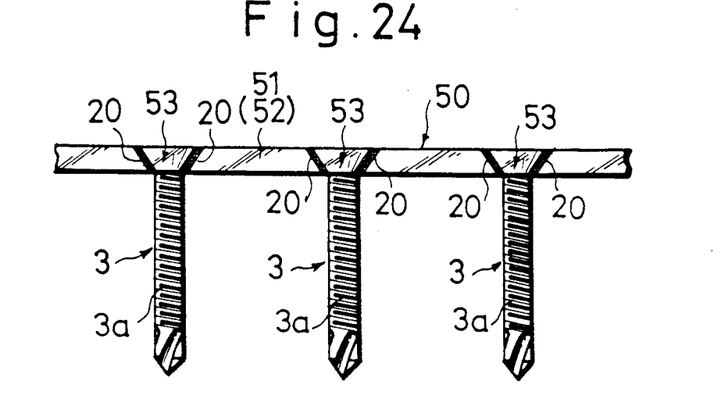
FIG. 24 is a front elevation of a strapped fastener assemblage according to a first example of the fifth embodiment of this invention.
Figure 25:
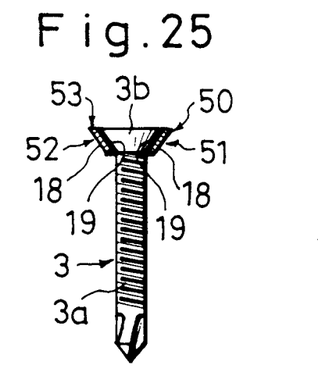
FIG. 25 is a longitudinal section of a screw retainer of the strapped fastener assemblage of FIG. 24.
Figure 26:
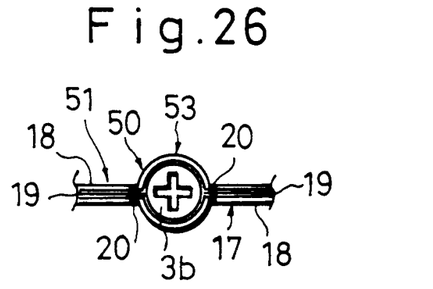
FIG. 26 is a plan view of part of the straped fastener assemblage of FIG. 24.
Figure 27:
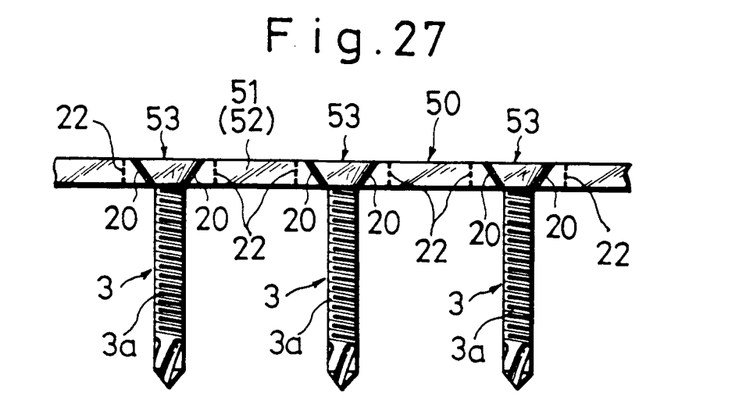
FIG. 27 is a front elevation of a strapped fastener assemblage according to a second example of the fifth embodiment of the invention.

FIGS. 24-27 illustrate the fifth embodiment of this invention. A strapped fastener assemblage 50 comprises a pair of connecting straps 51 and 52. As shown in FIG. 24, the pair of the connecting straps 51 and 52 includes conical-shaped screw retainers 53 retaining the head 3b of each screw 3. If the screw retainers 53 lack sufficient strength to retain the screw 3 in place, a pair of second connecting straps may additionally retain the threaded portion 3a of the screw 3. The connecting straps 51 and 52 may include any separation holes such as lines of sewing perforations 22 as shown in FIG. 27.

A strapped fastener assemblage may comprise a single connecting strap made of a paper laminated with a plastic film and forming a cylindrical screw retainer wound on the threaded portion of each screw.

A strapped faster assemblage may comprise a pair of connecting straps with different widths.

SIXTH EMBODIMENT

Figure 28:
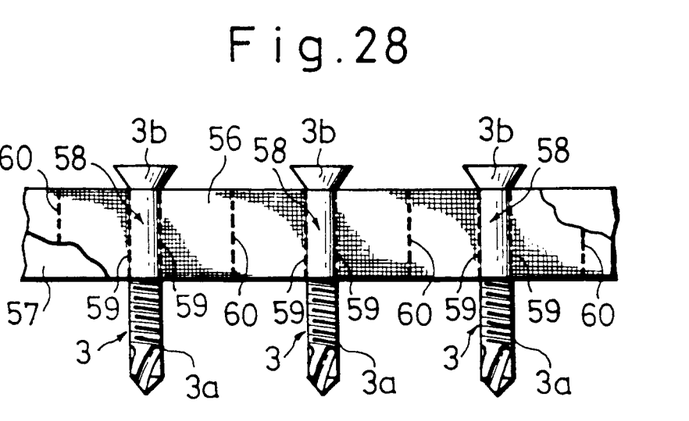
FIG. 28 is a front elevation of a strapped fastener assemblage according to a sixth embodiment of this invention.

FIG. 28 illustrates the sixth embodiment of this invention. A strapped fastener assemblage 55 comprises a pair of connecting straps 56 and 57, the inner surface of each of which has a laminated plastic film. Each of cylindrical screw retainers 58 formed by the pair of the connecting straps 56 and 57 retains the threaded portion 3a of each screw 3. The connecting strap 56 has two lines of sewing perforations 59 at front and rear edges of each screw retainer 58. The central portion of the connecting strap 56 has separation holes 60 between adjacent screw retainers 58. In addition, the connecting strap 57 may also have sewing perforations 59 and separation holes 60.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A strapped fastener assemblage, comprising:

a pair of connecting straps made of paper, a plastic film is laminated onto one surface of each of the connecting straps, the plastic-film-side surfaces of the connecting straps being in contact with each other;

a plurality of pin-like fasteners arranged generally parallel to one another with a predetermined spacing therebetween, each of said fasteners extending transversely of and between the connecting straps;

a plurality of fastener retainers each of which is defined by a pair of heat-sealed portions of the connecting straps extending transversely of the connecting straps, said fastener retainer retaining a corresponding one of said fasteners; and separation means provided on only one connecting strap of each fastener retainer for facilitating removal of the pin-like fastener from the fastener retainer.

2. The strapped fastener assemblage as set forth in claim 1, wherein the pin-like fasteners are nails.

3. The strapped fastener assemblage as set forth in claim 1, wherein each of said plurality of fastener retainers are tubular, said portions of the connecting straps defining the fastener retainers each being generally cylindrical and said separation means for each fastener retainer being located on one semicylindrical connecting strap of the pair of connecting straps defining that fastener retainer.

4. The strapped fastener assemblage as set forth in claim 1, wherein said separation means comprises sewing perforations extending transversely of the one connecting strap.

5. The strapped fastener assemblage as set forth in claim 4, wherein the sewing perforations extend between each edge of the one connecting strap.

6. The strapped fastener assemblage as set forth in claim 1, wherein a transverse width is generally the same for each of the connecting straps.

7. The strapped fastener assemblage as set forth in claim 4, wherein each of the pin-like fasteners has a head and an elongated portion, and wherein only one of the pair of connecting straps extends over at least the heads of each of the pin-like fasteners.

8. The strapped fastener assemblage as set forth in claim 7, wherein the connecting strap extending over the heads of each of the pin-like fasteners is different from the connecting strap having the separation means.

9. The strapped fastener assemblage as set forth in claim 1, wherein each of the pin-like fasteners has a head and an elongated portion, and wherein only one of the pair of connecting straps extends over at least the heads of each of the pin-like fasteners.

10. The strapped fastener assemblage as set forth in claim 9, wherein the connecting strap extending over the heads of each of the pin-like fasteners is different from the connecting strap having the separation means.

11. The strapped fastener assemblage as set forth in claim 1, wherein said separation means comprises at least one slot extending transversely of the one connecting strap for each of the fastener retainers.

12. The strapped fastener assemblage as set forth in claim 11, wherein each of the slots is provided between edges of the one connecting strap.

13. The strapped fastener assemblage as set forth in claim 11, wherein two slots are provided for each fastener retainer, said two slots being opposed and being located at edges of the one connecting strap.

14. The strapped fastener assemblage as set forth in claim 13, wherein each slot is generally V-shaped.

15. The strapped fastener assemblage as set forth in claim 14, wherein each slot is generally U-shaped.

16. The strapped fastener assemblage as set forth in claim 1, wherein the pin-like fasteners are screws.

* * * * *